(12) United States Patent
Li et al.

(10) Patent No.: US 11,663,179 B2
(45) Date of Patent: May 30, 2023

(54) DATA SIMULATION FOR REGRESSION ANALYSIS

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 17/128,277

(22) Filed: Dec. 21, 2020

(65) Prior Publication Data

US 2022/0197877 A1    Jun. 23, 2022

(51) Int. Cl.
*G06F 16/215* (2019.01)
*G06F 16/2455* (2019.01)

(52) U.S. Cl.
CPC ........ *G06F 16/215* (2019.01); *G06F 16/2456* (2019.01); *G06F 16/24565* (2019.01)

(58) Field of Classification Search
CPC ............... G06F 16/215; G06F 16/2456; G06F 16/24565
See application file for complete search history.

(56) References Cited

U.S. PATENT DOCUMENTS

| | | | |
|---|---|---|---|
| 9,727,608 B2 | 8/2017 | Cheng | |
| 9,946,810 B1* | 4/2018 | Trepetin | G06F 7/00 |
| 2007/0192342 A1* | 8/2007 | Shriraghav | G06F 16/2453 |
| 2008/0177700 A1 | 7/2008 | Li | |
| 2012/0310916 A1* | 12/2012 | Abadi | G06F 16/24542 |
| | | | 707/E17.017 |
| 2013/0159353 A1 | 6/2013 | Fuh | |
| 2014/0207731 A1* | 7/2014 | Mack | G06F 16/17 |
| | | | 707/609 |
| 2016/0171531 A1 | 6/2016 | Fanous | |
| 2018/0225475 A1* | 8/2018 | Watanabe | G06F 12/1408 |
| 2021/0209098 A1* | 7/2021 | Shi | G06F 16/2448 |

FOREIGN PATENT DOCUMENTS

WO    WO-9521407 A2 *  8/1995  ....... G06F 17/30445

OTHER PUBLICATIONS

"Column Segmentation", Published Date: Dec. 2018, 6 pages.
Mascaskill, Richard, "Basic data masking for development work using SQL Clone and SQL Data Generator", Data masking using SQL Clone and SQL Data Generator, Published Date: May 3, 2017, 22 pages, <https://www.red-gate.com/hub/product-learning/sql-data-generator/data-masking>.
Stellato, Erin, "Using DBCC CloneDatabase and Query Store for Testing", SQLPerformance.com, Feb. 22, 2017, 9 pages.
Tuya et al., "SQLMutation: A tool to generate mutants of SQL database queries", University of Oviedo (Spain), Nov. 2006, 5 pages.

* cited by examiner

*Primary Examiner* — Sherief Badawi
*Assistant Examiner* — Earl Levi Elias
(74) *Attorney, Agent, or Firm* — Stephen R. Yoder

(57) ABSTRACT

A simulated dataset is queried for regression by validating a structured query language (SQL) statement, determining a pattern type of the SQL statement, reconstructing the SQL statement according to a predetermined process for the pattern type, creating a mutated SQL statement for querying a simulated dataset, and validating the mutated SQL statement. The simulated dataset is based on a confidential dataset having the confidential elements removed or replaced.

15 Claims, 5 Drawing Sheets

DATA SIMULATION FOR REGRESSION ANALYSIS

BACKGROUND

The present invention relates generally to the field of computing, and more particularly to software regression analysis.

Database quality is very important, the main problem is that during the functional test, testers find it to be difficult to create proper data to make a complex query do return some records. This point focuses on the process to generate proper data based on the given query and ensures that the query has qualified records.

A conventional method is to mask the sensitive information for data. But most of customers would not like to do so for policy problem.

A foreign key, or referencing key, is a key used to link two tables together. The Foreign Key is a column or a combination of columns in one table whose values match a Primary Key in another table.

Structured Query Language (SQL) is a domain-specific language used in programming and designed for managing data held in a relational database management system (RDBMS) or for stream processing in a relational data stream management system (RDSMS). SQL is often used when handling structured data such as data incorporating relations among entities and variables.

SQL offers two main advantages over older read-write APIs such as ISAM or VSAM. Firstly, it introduced the concept of accessing many records with one single command. Secondly, it eliminates the need to specify how to reach a record, e.g. with or without an index.

A software regression is a software bug that makes a feature of a program stop functioning as intended. Regressions often occur after a certain event such as a system upgrade or a system patching event. Regression testing is a type of software testing that confirms recent program changes or code changes do not adversely affect existing program features. Regression testing is essentially a full or partial selection of already-executed test cases that are re-executed to ensure program functionalities work as expected after maintenance or migration.

SUMMARY

In one aspect of the present invention, a method, a computer program product, and a system includes: (i) validating a structured query language (SQL) statement; (ii) determining a pattern type of the SQL statement; (iii) reconstructing the SQL statement according to a predetermined process for the pattern type; (iv) creating a mutated SQL statement for querying a simulated dataset; and (v) validating the mutated SQL statement. The simulated dataset is based on a confidential dataset having the confidential elements removed or replaced.

DETAILED DESCRIPTION

Figure 1:
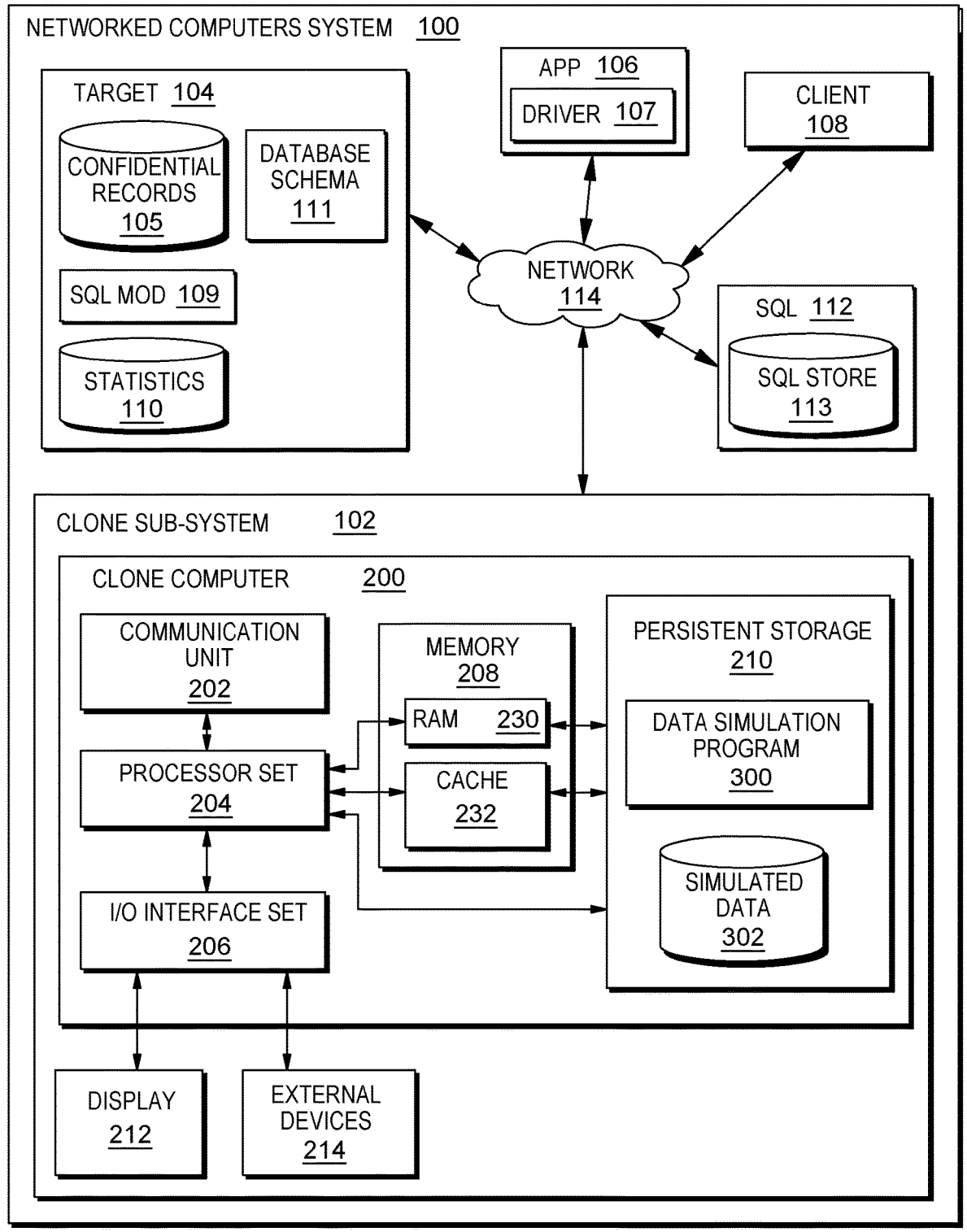
FIG. 1 is a schematic view of a first embodiment of a system according to the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: environment clone sub-system 102; target sub-systems 104; confidential records store 105; structured query language (SQL) module 109; environmental statistics store 110; database schema module 111; application sub-system 106; application driver 107; client sub-system 108; SQL sub-system 112; SQL store 113; communication network 114; clone computer 200; communication unit 202; processor set 204; input/output (I/O) interface set 206; memory device 208; persistent storage device 210; display device 212; external device set 214; random access memory (RAM) devices 230; cache memory device 232; data simulation program 300; and simulated data store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Some embodiments of the present invention recognize the following facts, potential problems and/or potential areas for improvement with respect to the current state of the art: (i) when programs are migrated or updated during regular maintenance activity, the revised programs may exhibit functional and/or performance regressions such as an "abend" where processes are terminated prior to completion or an "incorrout" where expected program output is not received or is different than expected; (ii) data security concerns including confidentiality may cause a user to resist sharing data for resolving the software regressions; (iii) data used by a particular program may become outdated or stale very quickly; and/or (iv) masking of the data may require licensed tools and efforts that are not practical.

Some embodiments of the present invention are directed to simulating an environment-specific system and database workload with catalog information, statistics, and queries.

The SQL mutation process discussed herein is responsible for mutating the SQL commands to make the command select records from data generated to simulate the confidential data of the original database. The data in tables is generated according to the statistical and join predicates instead of all predicates in the SQL commands. In that way, selecting a record from the generated data does not present confidential data. SQL mutation operates to mutate some literal values existing in the local predicates for getting records from the data in the original table.

Every SQL statement has certain composite formats that require more consideration when mutating the identified SQL statements. These different formats, or patterns, are dealt with according to how they are associated with the specified SQL statements. Generally, SQL mutation changes the literal value in the local predicates but not the data in the original table. In that way, the results of the mutation ensure the data matches the statistic of the customer and appropriate records can be returned.

Some embodiments of the present invention are directed to an SQL mutation process that includes a pattern sort component. Pattern sort is the premise of mutation in that sorting the SQL is based on patterns indicative of an SQL type, such as types including the subqueries, functions, and/or table expressions. How to solve the SQL mutation depends upon which pattern the SQL matches.

Some mutated SQL statements or queries produce a set of results. A set of SQL statements are output as original SQL when they produce results. The set of SQL statements referred to as original SQL are differentiated with literal value replacement and are mutated according to the frequency of the literal values in the result set. The mutated SQL statements are validated again to ensure the mutation was performed correctly.

Some embodiments of the present invention process original SQL queries by sorting the SQL queries according to pattern types. For each pattern type, literal values are replaced and mutated to generate mutated SQL queries for data generated to exclude confidential information.

Figure 2A:
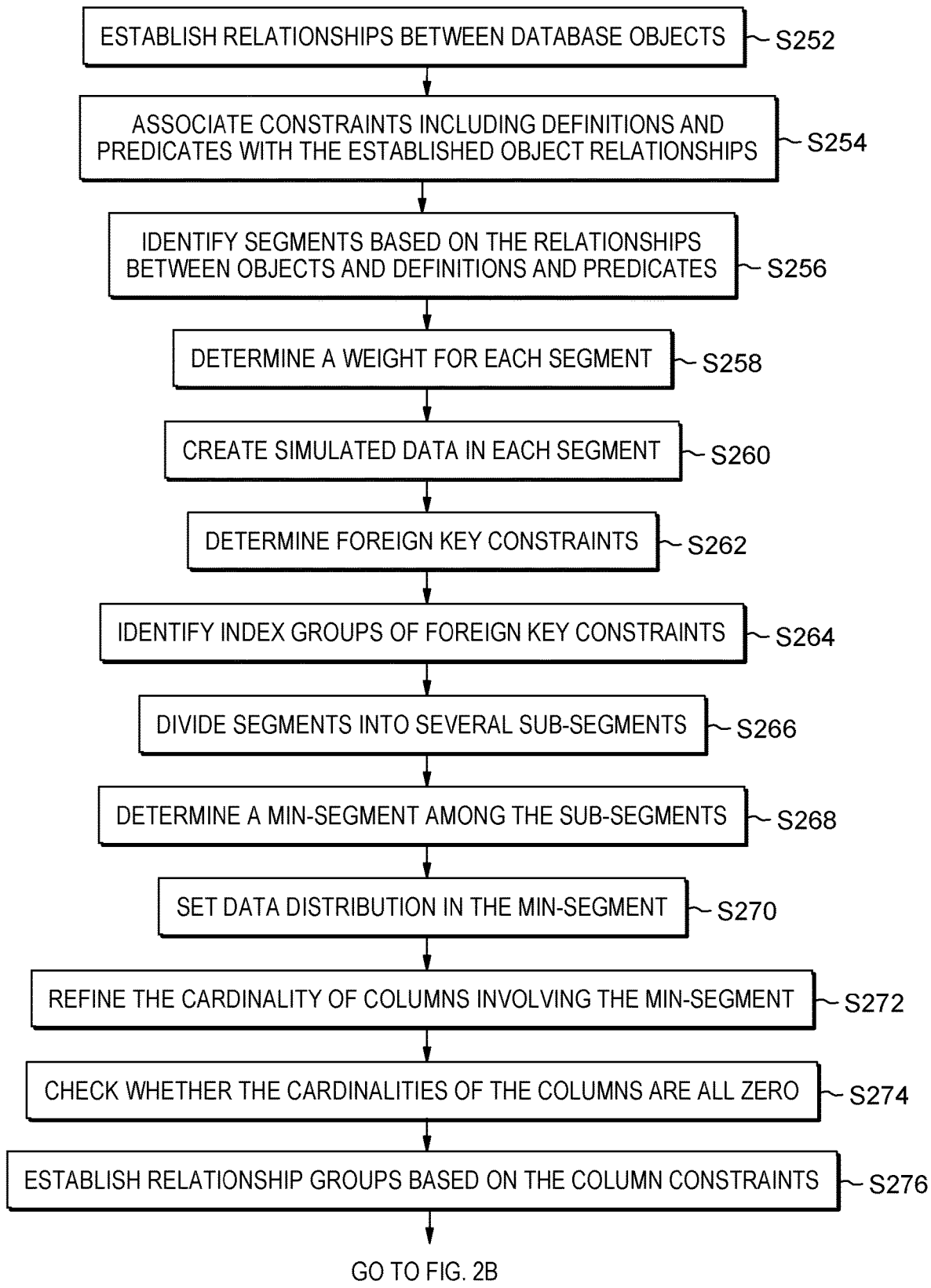
FIGS. 2A and 2B depict a flowchart showing a first method performed, at least in part, by the first embodiment system.
Figure 2B:
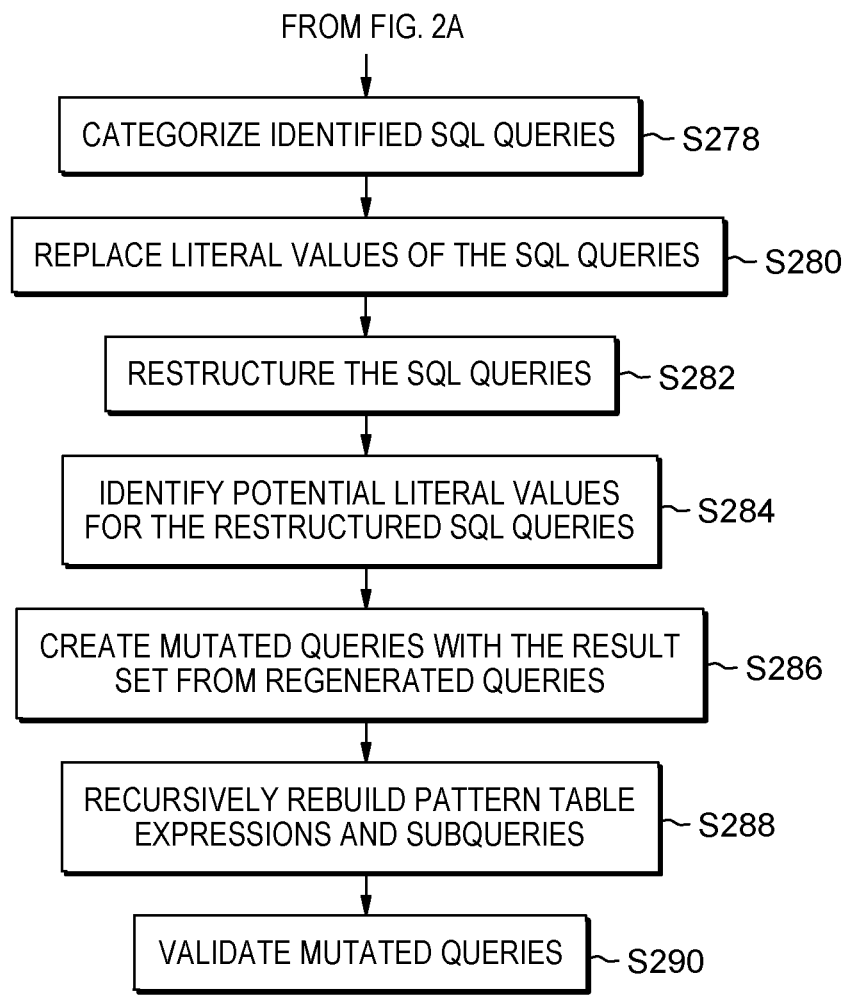
Figure 3:
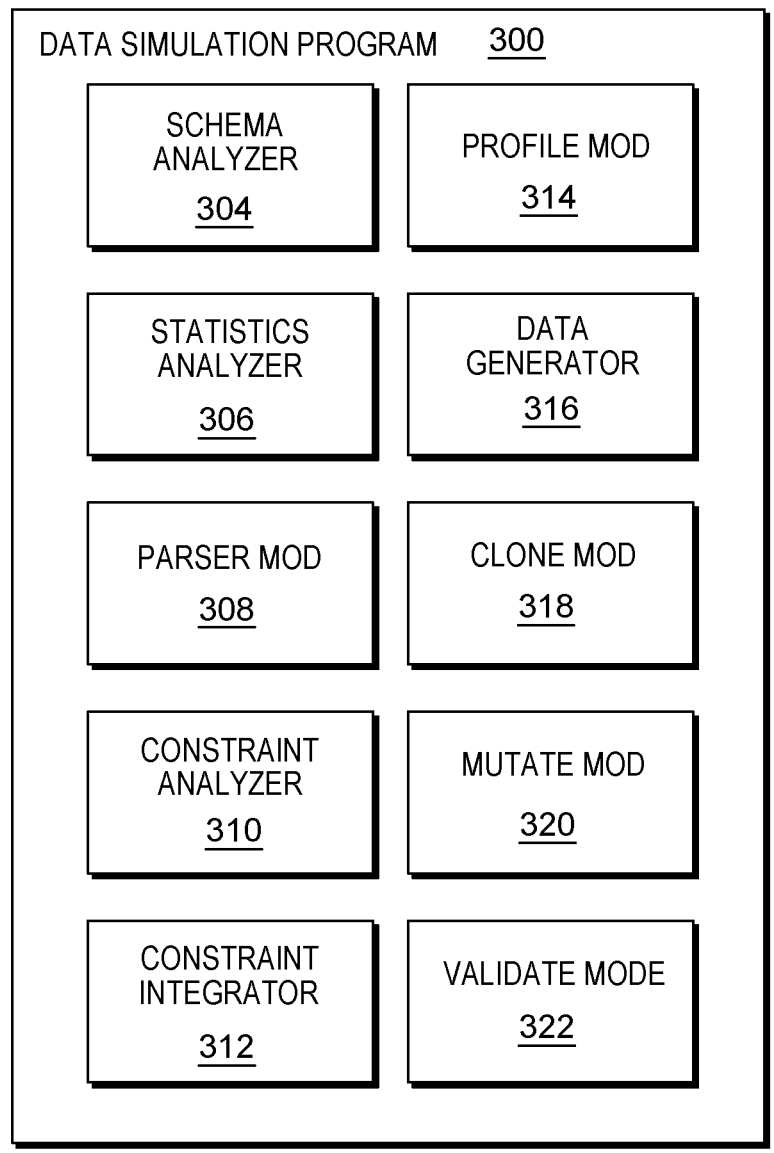
FIG. 3 is a schematic view of a machine logic (for example, software) portion of the first embodiment system.

FIGS. 2A and 2B show flowchart 250 depicting a first method according to the present invention. FIG. 3 shows program 300 for performing at least some of the method steps of flowchart 250. This method and associated software will now be discussed, over the course of the following paragraphs, with extensive reference to FIGS. 2A and 2B (for the method step blocks) and FIG. 3 (for the software blocks).

Processing begins at step S252, where schema analyzer 304 establishes relationships between database objects. In this example, database objects of target sub-system 104 (FIG. 1) are identified by database schema module 111 (FIG. 1). Objects may include, but are not limited to, tables, single columns, multiple columns, and/or partition tables. Distribution statistics on a table may include: (i) high2key; (ii) low2key; (iii) cardinality; and (iv) frequency. Cardinality may be expressed as COLCARD (the number of distinct values) and CARD (the number of rows in a column). HIGH2KEY and LOW2KEY in SYSSTAT.COLUMNS each represent ASCII versions of a second highest and a second lowest value of a column. For example, an ASCII representation of an integer value may be anywhere from 1 to 11 characters, including a sign.

Processing proceeds to step S254, where constraint analyzer 310 relates various constraints including definitions and predicates with the established object relationships.

Processing proceeds to step S256, where schema analyzer 310 identifies segments based on the relationships between objects and definitions and predicates. In this example, definitions and predicates of target sub-system 104 are generated by SQL module 109 (FIG. 1).

Processing proceeds to step S258, where statistics analyzer 306 determines a weight for each segment.

Processing proceeds to step S260, where data generator 316 creates simulated data in each segment. In this example, simulated data is stored in simulated data store 302 (FIG. 1).

Processing proceeds to step S262, where constraint analyzer 310 determines foreign key constraints.

Processing proceeds to step S264, where statistics analyzer 306 identifies index groups of the foreign key constraints.

Processing proceeds to step S266, where constraint integrator 312 divides segments into several sub-segments.

Processing proceeds to step S268, where constraint integrator 312 determines a min-segment among the sub-segments.

Processing proceeds to step S270, where profile module 314 sets data distribution in the min-segment.

Processing proceeds to step S272, where profile module 314 refines the cardinality of columns involving the min-segment.

Processing proceeds to step S274, where statistics analyzer 306 checks whether the cardinalities of the columns are all zero.

Processing proceeds to step S276, where constraint integrator 312 establishes relationship groups based the column constraints.

Processing proceeds to step S278, where parse module 308 categorizes identified SQL queries. In this example, identified SQL queries are located in SQL store 113 of SQL sub-system 112 (FIG. 1).

Processing proceeds to step S280, where clone module 318 replaces literal values of the SQL queries.

Processing proceeds to step S282, where clone module 318 restructures the SQL queries.

Processing proceeds to step S284, where mutate module 320 identifies potential literal values for the restructured SQL queries.

Processing proceeds to step S286, where mutate module 320 creates mutated SQL queries with the result set from regenerated queries. In this example, mutated SQL queries are stored in SQL store 113 (FIG. 1).

Processing proceeds to step S288, where clone module 318 recursively rebuilds pattern table expressions and sub-queries.

Processing ends at step S290, where validate module 322 validates mutated SQL queries.

Further embodiments of the present invention are discussed in the paragraphs that follow and later with reference to FIG. 4.

Some embodiments of the present invention are directed to predicate analysis. In the example embodiment of FIG. 3, the constraint analyzer may analyze predicates of identified SQL statements. Example predicate analysis includes determine a predicate type, such as integer, and statistics associated with the predicates including cardinality, high2key, low2key, and frequency. An example set of related SQLs are P_PARTKEY=PS_PARTKEY, L_PARTKEY=PS_PARTKEY, and P_PARTKEY=L_PARTKEY. The predicates and corresponding statistics of the listed predicates are found in Table 1.

TABLE 1

Example predicates and corresponding statistics.

| PREDICATE | TYPE | CARD | HIGH2KEY | LOW2KEY | FREQUENCY |
|---|---|---|---|---|---|
| P_PARTKEY | INTEGER | 164176 | 180000 | 10000 | |
| PS_PARTKEY | INTEGER | 38305 | 43304 | 5002 | |
| L_PARTKEY | INTEGER | 200000 | 199999 | 2 | 15000 times 5000 |

Cardinality may be analyzed as follows:

$$Card_i = \min\left(W_i \bigg/ \sum_{j=start}^{end} W_i \times (Card - SEG\#), (High - Low - FreqCard)\right) \quad (1)$$

Referring to the ranges specified for the predicates, equation 1 becomes:

$$Card_2 = \min\left(\frac{3}{\sum_{j=1}^{3} W_i \times 199996}, (43304 - 10000 - 1)\right) = \quad (2)$$

$$\min(119998, 33303) = 33303$$

Accordingly, analysis of the predicate L_PARTKEY is as follows:

| L_PARTKEY: | [10000, 43303] | card = 33303 |
| | [5002, 9999] | card = 4998 |
| | [43304, 179999] | card = 136696 |
| | [3, 5001] | card = 4999 |
| | [180000,199998] | card = 199999 |
| | [1,1] | card= 1 |
| | [2,2] | card= 1 |
| | [199999, 199999] | card = 1 |
| | [200000, 200000] | card = 1 |

Simulated data generated for predicate L_PARTKEY may be accomplished as follows:

```
<Column CCSID="0" colNo="2" default="" length="4"
name="L_PARTKEY"
  nullable="false" scale="0" type="INTEGER">
  <FrequencyList>
    <Frequency value="15000" times="5000" />
  </FrequencyList>
```

```
<SectionList>
   <sNo="1" start = "10000" end = "43303" card="33303" step="1">
   <sNo="2" start = "5002" end = "9999" card="4998" step="1">
   <sNo="3" start = "43304" end = "179999" card="136696"
   step="1">
   <sNo="4" start = "3" end = "5001" card="4999" step="1">
   <sNo="5" start = "180000" end = "199998" card="199999"
   step="1">
   <sNo="6" start = "1" end = "1" card="1" step="0">
   <sNo="7" start = "2" end = "2" card="1" step="0">
   <sNo="8" start = "199999" end = "199999" card="1" step="0">
   <sNo="9" start = "200000" end = "200000" card="1" step="0">
</SectionList>
</Column>
```

The resulting simulated data sequence from the above example is:

```
Data Sequence:
15000,
10000, 10001......43303,
5002, 5003 ....... 4998
......
200000,
15000,
10000,10001......43303,
.......
15000, 15000, 15000 .......
```

Example SQL mutation processes according to some embodiments of the present invention are discussed in the paragraphs that follow. SQL statements are captured from an originating environment for cloning. Cloning the environment support in-house regression testing between program temporary fixes, performance updates, and new version releases of software products. The processes described below begin with parsing the SQL text as a parse tree. SQL commands or clauses are sorted by pattern types such as simple pattern without host variable, simple pattern with host variable, nested subquery, having clause, and table expression.

Simple pattern without host variable:

```
SELECT DISTINCT PERSON.DEERS_ID
FROM LWDIM.PERSON_D AS PERSON
   , LWDIM.ENRLE_PCM_F AS ENROLLEE_PCM
   , LWDIM.PROV_D AS T3
WHERE ( ENROLLEE_PCM.CURR_ENRLEPCM_MLT  = 1
   AND PERSON.ENROLL_MLT = 1
   AND T3.PROV_TAX_ID LIKE '4865%'
   AND PERSON.PERSON_SK =
   ENROLLEE_PCM.PERSON_SK
   AND T3.PROVIDER_SK =
   ENROLLEE_PCM.PROVIDER_SK
   )
```

Simple pattern with host variable:

```
SELECT DISTINCT J72.FUND_CDE
   INTO :H
FROM PRSP#S.R11_A999 AS R11
INNER JOIN PRSP#S.FG5_A999 AS FG5
   ON R11.FI_FUND_GROUP_NBR =
   FG5.FI_FUND_GROUP_NBR
   AND R11.FINANCIAL_INST_ID =
   FG5.FINANCIAL_INST_ID
INNER JOIN PRSP#S.BP3_A999 AS BP3
   ON FG5.FCS_DTR_ID_1 = BP3.FCS_DTR_ID_1
   AND FG5.FCS_DTR_ID_2 = BP3.FCS_DTR_ID_2
```

```
INNER JOIN PRSP#S.J72_A999 AS J72
   ON BP3.FUND_CODE = J72.FUND_CDE
   WHERE J72.SEC_ISS_ID = :H
      AND R11.FIRM_NBR = :H
```

Subquery pattern—Table Expression:

```
SELECT T1.C0
FROM TABLE
   (  SELECT CS_CONTACT.CS.CNTCT_ID AS C0
      FROM LWDIM.DATE_D AS T3
         , LWDIM.CS_CNTCT_D AS CS_CONTACT
         , LWDIM.CS_CNTCT_DTL_F AS
         CS_CONTACT_DETAIL
      WHERE T3.DATE BETWEEN '2009-01-01' AND '2009-01-20'
         AND CS_CONTACT.CS_CNTCT_SK =
         CS_CONTACT_DETAIL.CS_CNTCT_SK
   )  AS T0( C0)
   , TABLE
   (  SELECT CS_CONTACT.CS_CNTCT_ID AS C0
      FROM LWDIM.CS.CNTCT_D AS T3
         , LWDIM.CS_CNTCT_D AS CS_CONTACT
         , LWDIM.CS_CNTCT_DTL_F AS
         CS_CONTACT_DETAIL
      WHERE  T3.DATE BETWEEN '2009-01-01' AND
      '2009-01-20'
         AND CS_CONTACT.CS_CNTCT_SK =
         CS_CONTACT_DETAIL.CS_CNTCT_SK
   )AS T1(C0)
WHERE T1.C0 = T0.C0
```

Subquery pattern—nested or "in" subquery:

```
SELECT 'Y'
   INTO :H
FROM PRSP#S.AU8_A999 AS AU8
   WHERE AU8.NSCC_REQUEST_ID_1 = :H
      AND AU8.NSCC_REQUEST_ID_2 = :H
      AND AU8.NSCC_REQ_DIALOG_ID IN
   (SELECT AU8.NSCC_REQ_DIALOG_ID
   FROM PRSP#S.AU8_A999 AS AU8
      WHERE AU8.NSCC_REQUEST_ID_1 = :H
         AND AU8.NSCC_REQUEST_ID_2 = :H
         AND AU8.NSCC_TRANS_TYPE_CD IN ('070'))
```

SQL mutations vary according to determined type of SQL statement. Example pattern-specific mutations follow:

An original query is presented to illustrate SQL mutation for the simple patterns:

```
SELECT DISTINCT PERSON.DEERS_ID
FROM LWDIM.PERSON_D AS PERSON
   , LWDIM.ENRLE_PCM_F AS ENROLLEE_PCM
   , LWDIM.PROV_D AS T3
WHERE ( ENROLLEE_PCM.CURR_ENRLEPCM_MLT  = 1
   AND PERSON.ENROLL_MLT = 1
   AND T3.PROV_TAX_ID LIKE '4865%'
   AND PERSON.PERSON_SK =
   ENROLLEE_PCM.PERSON_SK
   AND T3.PROVIDER_SK =
   ENROLLEE_PCM.PROVIDER_SK
   )
```

The join predicate is extracted:

```
SELECT DISTINCT PERSON.DEERS_ID
FROM LWDIM.PERSON_D AS PERSON
     , LWDIM.ENRLE_PCM_F AS ENROLLEE_PCM
     , LWDIM.PROV_D AS T3
WHERE ( ENROLLEE_PCM.CURR_ENRLEPCM_MLT = 1
     AND PERSON.ENROLL_MLT = 1
     AND T3.PROV_TAX_ID_LIKE '4865% '
     AND PERSON.PERSON_SK = ENROLLEE_PCM.PERSON_SK
     AND T3.PROVIDER_SK = ENROLLEE_PCM.PROVIDER_SK
     )
```

The SQL statement is restructured:

```
SELECT DISTINCT ENROLLEE_PCM.CURR_ENRLEPCM_MLT,
               PERSON.ENROLL_MLT,
               T3.PROV_TAX_ID,
               count(*) AS RESULT
FROM LWDIM.PERSON_D AS PERSON
   , LWDIM.ENRLE_PCM_F AS ENROLLEE_PCM
   , LWDIM.PROV_D AS T3
Where ( PERSON.PERSON_SK = ENROLLEE_PCM.PERSON_SK
       AND T3.PROVIDER_SK = ENROLLEE_PCM.PROVIDER_SK
       )
group by ENROLLEE_PCM.CURR_ENRLEPCM_MLT ,PERSON.ENROLL_MLT ,T3.PROV_TAX_ID
ORDER BY RESULT DESC
```

A sample result set is shown in Table 2.

TABLE 2

Sample result set for SQL mutation.

| CURR_ENRLEPCM_MLT | ENROLL_MLT | PROVIDER_ID |
|---|---|---|
| 1 | 1 | a |

The mutated SQL is shown below:

```
SELECT DISTINCT PERSON.DEERS_ID
FROM LWDIM.PERSON_D AS PERSON
   , LWDIM.ENRLE_PCM_F AS ENROLLEE_PCM
   , LWDIM.PROV_D AS T3
WHERE ( ENROLLEE_PCM.CURR_ENRLEPCM_MLT = 1
     AND PERSON.ENROLL_MLT = 1
     AND T3.PROV_TAX_ID LIKE 'a'
     AND PERSON.PERSON_SK =
         ENROLLEE_PCM.PERSON_SK
     AND T3.PROVIDER_SK =
         ENROLLEE_PCM.PROVIDER_SK
     )
```

An original query is presented to illustrate SQL mutation for the subquery patterns:

```
SELECT *
FROM PRSP#S.AU8_A999 AS AU8
    WHERE AU8.NSCC_REQUEST_ID_1 = :H
    AND AU8.NSCC_REQUEST_ID_2 = :H
    AND AU8.NSCC_REQ_DIALOG_ID IN
    (SELECT AU8.NSCC_REQUEST_ID_1
FROM PRSP#S.AU8_A999 AS AU8
    WHERE AU8.NSCC_REQUEST_ID_1 = :H
    AND AU8.NSCC_REQUEST_ID_2 = :H
    AND AU8.NSCC_TRANS_TYPE_CD IN ('070'))
```

No join predicates to extract in this example SQL, so the original SQL is restructured:

```
SELECT AU8.NSCC_REQUEST_ID_1,
       AU8.NSCC_REQUEST_ID_2 ,
       AU8.NSCC_TRANS_TYPE_CD ,
       COUNT ( * ) AS RESULT
WHERE AU8.NSCC_REQUEST_ID_1 IN
    ( SELECT AU8.NSCC_REQ_DIALOG_ID
      FROM RSP#S.AU8_A999 AS AU8)
GROUP BY AU8.NSCC_REQUEST_ID_1 , AU8.NSCC_REQUEST_ID_2 ,
       AU8.NSCC_TRANS-TYPE_CD
ORDER BY RESULT DESC
```

A sample result set is shown in Table 3.

TABLE 3

Sample result set for SQL mutation.

| NSCC_REQUEST_ID_1 | NSCC_REQUEST_ID_2 | NSCC_TRANS_TYPE_CD |
|---|---|---|
| 1 | 99999999990 | a |
| 2 | 00000000001 | a |
| 3 | 99999999992 | a |
| 4 | 99999999993 | a |
| 5 | 99999999994 | a |
| 6 | 99999999995 | a |
| 7 | 99999999996 | a |
| 8 | 99999999997 | a |
| 9 | 99999999998 | a |

The SQL is further restructured as shown below:

```
SELECT AU8.NSCC_REQUEST_ID_1 ,
       AU8.NSCC_REQUEST_ID_2 ,
COUNT ( * )
FROM PRSP#S.AU8_A999 AS AU8
     WHERE AU8.NSCC_REQ_DIALOG_ID IN
     ( SELECT AU8.NSCC_REQUEST_ID_1
FROM PRSP#S.AU8_A999 AS AU8
     WHERE AU8.NSCC_REQUEST_ID_1 = 1
       AND AU8.NSCC_REQUEST_ID_2 = 99999999990
       AND AU8.NSCC_TRANS_TYPE_CD IN ( 'a' ) )
GROUP BY AU8.NSCC_REQUEST_ID_1 , AU8.NSCC_REQUEST_ID_2 ,
ORDER BY RESULT DESC
```

Another sample result set is shown in Table 4.

TABLE 4

Sample result set for SQL mutation.

| NSCC_REQUEST_ID_1 | NSCC_REQUEST_ID_2 |
|---|---|
| 1 | 99999999990 |

The mutated SQL is shown below:

```
SELECT *
    FROM PRSP#S.AU8_A999 AS AU8
       WHERE AU8.NSCC_REQUEST_ID_1 = 1
         AND AU8.NSCC_REQUEST_ID_2 = 99999999990
         AND AU8.NSCC_REQ_DIALOG_ID IN
    (SELECT AU8.NSCC_REQUEST_ID_1
    FROM PRSP#S.AU8_A999 AS AU8
       WHERE AU8.NSCC_REQUEST_ID_1 = 1
         AND AU8.NSCC_REQUEST_ID_2 = 99999999990
         AND AU8.NSCC_TRANS_TYPE_CD IN ('a'))
```

An original query is presented to illustrate SQL mutation for the table expression patterns:

```
SELECT * FROM TABLE
   (  SELECT T3.DATE AS C0
      FROM LWDIM.DATE_D AS T3
         , LWDIM.CS_CNTCT_D AS CS_CONTACT
         , LWDIM.CS_CNTCT_DTL_F AS
         CS_CONTACT_DETAIL
      WHERE ( T3.DATE BETWEEN '2009-01-01' AND
      '2009-01-20'
             AND CS_CONTACT.CS_CNTCT_SK =
             CS_CONTACT_DETAIL.CS_CNTCT_SK
             AND T3.DATE_SK =
             CS_CONTACT_DETAIL.CNTCT_CLOSE_DT_SK)
   )  AS T0( C0)
, TABLE
   ( SELECT
      T3.DATE AS C4
     FROM LWDIM.DATE_D AS T3
        , LWDIM.CS_CNTCT_D AS CS_CONTACT
        , LWDIM.CS_CNTCT_DTL_F AS
        CS_CONTACT_DETAIL
     WHERE  ( T3.DATE BETWEEN '2009-01-01' AND
     '2009-01-20'
             AND CS_CONTACT.CS_CNTCT_SK =
             CS_CONTACT_DETAIL.CS_CNTCT_SK
             AND T3.DATE_SK =
             CS_CONTACT_DETAIL.CNTCT_CLOSE_DT_SK
   )
   )  AS T1( C0 )
WHERE T1.C0 = T0.C0
```

The join predicate is extracted:

```
SELECT * FROM TABLE
      ( SELECT T3.DATE AS C0
        FROM LWDIM.DATE_D AS T3
          , LWDIM.CS_CNTCT_D AS CS_CONTACT
          , LWDIM.CS_CNTCT_DTL_F AS CS_CONTACT_DETAIL
        WHERE ( T3.DATE BETWEEN '2009-01-01' AND '2009-01-20'
                AND CS_CONTACT.CS_CNTCT_SK = CS_CONTACT_DETAILS.CS_CNTCT_SK
                AND T3.DATE_SK = CS_CONTACT_DETAIL.CNTCT_CLOSE_DT_SK)
      ) AS T0( C0)
    , TABLE
        ( SELECT
                T3.DATE AS C4
          FROM LWDIM.DATE_D AS T3
            , LWDIM.CS_CNTCT_D AS CS_CONTACT
            , LWDIM.CS_CNTCT_DTL_F AS CS_CONTACT_DETAIL
          WHERE ( T3.DATE BETWEEN '2009-01-01' AND '2009-01-20'
                  AND CS_CONTACT.CS_CNTCT_SK = CS_CONTACT_DETAILS.CS_CNTCT_SK
                  AND T3.DATE_SK = CS_CONTACT_DETAIL.CNTCT_CLOSE_DT_SK
                )
        ) AS T1( C0 )
WHERE T1.C0 = T0.C0
```

The SQL statement is restructured:

```
SELECT T0.C0 AS T0C0, T1.C0 AS T1C0,COUNT(*) AS RESULT
FROM TABLE
      ( SELECT T3.DATE AS C0
        FROM LWDIM.DATE_D AS T3
           , LWDIM.CS_CNTCT_D AS CS_CONTACT
           , LWDIM.CS_CNTCT_DTL_F AS CS_CONTACT_DETAIL
        WHERE ( CS_CONTACT.CS_CNTCT_SK = CS_CONTACT_DETAIL.CS_CNTCT_SK
                AND T3.DATE_SK = CS_CONTACT_DETAIL.CNTCT_CLOSE_DT_SK
              )
      )
  AS T0(C0)
, TABLE
      ( SELECT T3.DATE AS C0
        FROM LWDIM.DATE_D AS T3
           , LWDIM.CS_CNTCT_D AS CS_CONTACT
           , LWDIM.CS_CNTCT_DTL_F AS CS_CONTACT_DETAIL
        WHERE ( CS_CONTACT.CS_CNTCT_SK = CS_CONTACT_DETAIL.CS_CNTCT_SK
                AND T3.DATE_SK = CS_CONTACT_DETAIL.CNTCT_CLOSE_DT_SK
              )
      )
    AS T1(C0)
WHERE ( T1.C0 = T0.C0
      )
GROUP BY T0.C0,T1.C0
ORDER BY RESULT DESC
```

A sample result set is shown in Table 5.

TABLE 5

Sample result set for SQL mutation.

| T0T3 | T1T3 |
|---|---|
| 200-01-01 | 2000-01-01 |

The mutated SQL is shown below:

```
SELECT * FROM TABLE
      ( SELECT T3.DATE AS C0
        FROM LWDIM.DATE_D AS T3
          , LWDIM.CS_CNTCT_D AS CS_CONTACT
          , LWDIM.CS_CNTCT_DTL_F AS CS_CONTACT_DETAIL
```

```
        WHERE ( T3.DATE BETWEEN '2000-01-01' AND '2000-01-01'
               AND CS_CONTACT.CS_CNTCT_SK = CS_CONTACT_DETAIL.CS_CNTCT_SK
               AND T3.DATE_SK = CS_CONTACT_DETAIL.CNTCT_CLOSE_DT_SK)
        ) AS T0( C0)
    , TABLE
        ( SELECT
              T3.DATE AS C4
          FROM LWDIM.DATE_D AS T3
             , LWDIM.CS_CNTCT_D AS CS_CONTACT
             , LWDIM.CS_CNTCT_DTL_F AS CS_CONTACT_DETAIL
          WHERE ( T3.DATE BETWEEN '2000-01-01' AND '2000-01-01'
                 AND CS_CONTACT.CS_CNTCT_SK = CS_CONTACT_DETAIL.CS_CNTCT_SK
                 AND T3.DATE_SK = CS_CONTACT_DETAIL.CNTCT_CLOSE_DT_SK
                )
        ) AS T1( C0 )
WHERE   T1.C0 = T0.C0
```

Some embodiments of the present invention are directed to executing queries on data generated in a way to exclude confidential information. The process captures environmental data of a customer system. A test database is prepared including explain tables, SQL statements, and a configuration file. The test database is analyzed to generate new data. The new data is loaded into the test database and the SQL queries are executed to generate sample result sets. The sample result sets are compared to results from corresponding queries in the customer system to confirm validity of the mutated SQL queries on the new data.

Some embodiments of the present invention are directed to a process having inputs that include: (i) database sub system connection information where the database sub system has been prepared with statistics, commands that define the different structures in the database (DDLs), and/or explain tables; (ii) SQL statements; and/or (iii) additional parameters such as scaling factors.

Some embodiments of the present invention are directed to a process having outputs that include: (i) database load files; (ii) mutated SQLs with new constants; (iii) files with generated parameter marker values; and/or (iv) all generated data are placed in a local file system.

Some embodiments of the present invention use inputs and outputs of a database sub-system to establish a data clone and initiate SQL mutation.

Figure 4:
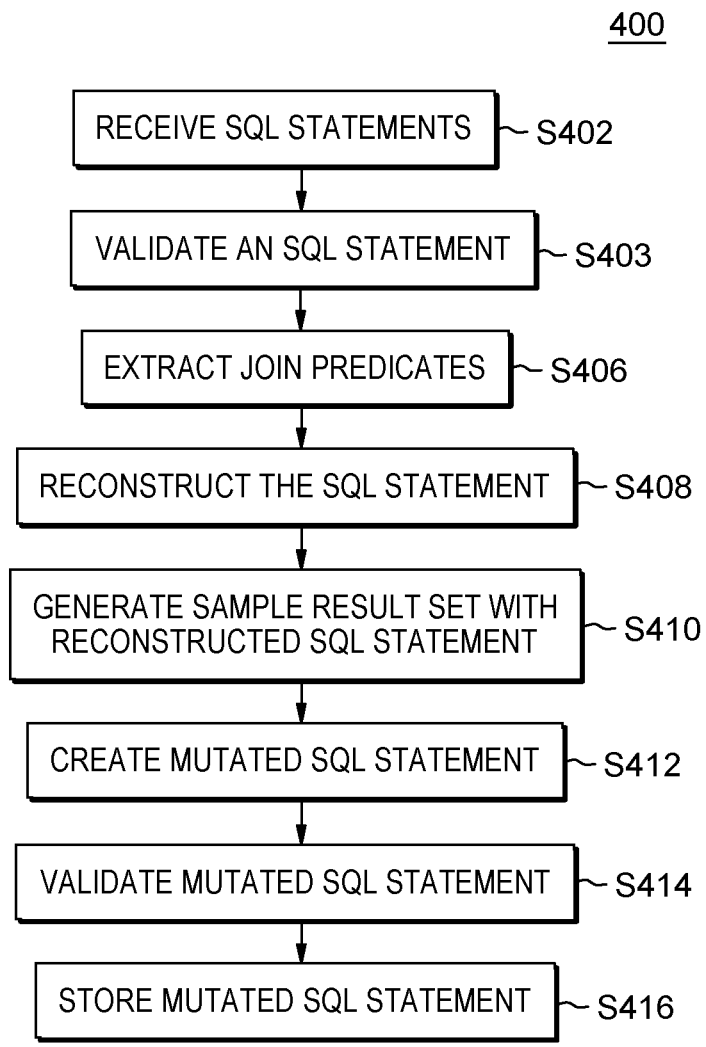
FIG. 4 is a flowchart showing a second method performed according to embodiments of the present invention.

FIG. 4 depicts system flow 400 for mutating and storing mutated SQL statements according to some embodiments of the present invention.

Processing begins at step S402 where SQL statements are received from a source computing environment.

Processing proceeds to step S404 where an SQL statement is validated.

Processing proceeds to step S406 where join predicates are extracted from the SQL statement. The SQL mutation process produces a new SQL for getting a result set only related with join predicates. For this reason, the join predicates in the original SQL are extracted for reconstructing the new SQL.

Processing proceeds to step S408 where the SQL statement is reconstructed. The SQL mutation operates to mutate the literal value of local predicates in the SQL, so the value must be selected by a new SQL based on the original SQL for confirming the literal value of local predicates.

Processing proceeds to step S410 where sample results set is generated with the reconstructed SQL. Typically, the result set has more than one record. The local predicates can be set with different value pairs. Because mutation does not need to fit all situations, sampling the result set is performed for this step. The detailed sampling method is based on selecting the record whose frequency is highest.

Processing proceeds to step S412 where the mutated SQL statement is created. Mutating the SQL is based on values derived from sampled result set. The output is the group of SQLs for the result of sampling, which can be two or more record couples. In this step, the component shall be divided with some situation according to its operator and expression.

Processing proceeds to step S414 where the mutated SQL statement is validated.

Process ends with step S416 where the mutated SQL is stored when successfully validated. When the mutated SQL statement produces results according to the original SQL without confidential data, the mutated SQL is stored for use. Accordingly, the workload from users is simulated without confidential information.

Some embodiments of the present invention are directed to cloning an environment according to database statistics, data definition language (DDL), and SQL queries.

Some embodiments of the present invention are directed to a predicate analyzer operating to add weight to the most overlapping segments in a database.

Some embodiments of the present invention are directed to handling constraints using foreign key processes.

Some embodiments of the present invention mutate SQL queries based on simple mutation patterns, subquery patterns, and a having clause.

Some embodiments of the present invention may include one, or more, of the following features, characteristics and/or advantages: (i) improve database quality; (ii) produces more cases similar with customer case for test to improve the database quality; (iii) in a cloud environment, more customers may be available to test their test case online to make sure the database could work correctly; (iv) reduces security problems; (v) there is no data security problem for customers to worry about; (vi) reduces legal problems where a database company has no need to require customer data; (vii) focuses on the similar environment as the originating environment; (viii) uses a weighting scheme for segments and takes foreign keys into consideration; and/or (ix) uses table constraints to set up the clone environment.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying an original database sub-system in an originating computing environment including distribution statistics, structured query language (SQL) statements, and an original database including a confidential data;
   capturing original SQL statements from the originating computing environment;
   setting up a data clone of the originating computing environment using table constraints, the distribution statistics, and the SQL statements;
   determining a pattern indicative of a first SQL type of a first original SQL statement;
   reconstructing the first original SQL statement according to a predetermined process for the first SQL type to create a first mutated SQL statement by extracting join predicates in the first original SQL statement;
   creating, from the reconstructed SQL statement, the first mutated SQL statement including only predicates from the extracted join predicates for querying the data clone,
   generating results by the first mutated SQL statement, the results being tables generated according to the extracted join predicates, the tables including simulated data simulating the confidential data of the original database;
   responsive to the first mutated SQL statement generating results, recursively rebuilding pattern table expressions and subqueries of the original database sub-system;
   validating the first mutated SQL statement;
   executing a query on the tables including simulated data; and
   receiving a results set of the query, the results set excluding the confidential data.

2. The method of claim 1, further comprising:
   extracting the first original SQL statement from the original database sub-system including the confidential data.

3. The method of claim 1, wherein the pattern indicative of an SQL type is one of the following patterns:
   a) a simple pattern without host variable,
   b) a simple pattern with host variable,
   c) a nested subquery,
   d) a having clause, and
   e) a table expression.

4. The method of claim 1, further comprising:
   determining foreign key constraints associated with the confidential dataset;
   identifying index groups of the foreign key constraints; and
   establishing relationship groups based on the table constraints to set up the data clone.

5. The method of claim 1, further comprising:
   identifying column segments in tables generated by the original SQL statements based on relationships between objects, definitions, and predicates; and
   determining weights for the identified column segments according to overlap in columns of the confidential data;
   wherein:
   generating the tables is further based on the determined weights.

6. A computer program product comprising a computer-readable storage medium having a set of instructions stored therein which, when executed by a processor, causes the processor to perform a method comprising:
   identifying an original database sub-system in an originating computing environment including distribution statistics, structured query language (SQL) statements, and an original database including confidential data;
   capturing original SQL statements from the originating computing environment;
   setting up a data clone of the originating computing environment using table constraints, the distribution statistics, and the SQL statements;
   determining a pattern indicative of a first SQL type of a first original SQL statement;
   reconstructing the first original SQL statement according to a predetermined process for the first SQL type to create a first mutated SQL statement by extracting join predicates in the first original SQL statement;
   creating, from the reconstructed SQL statement, the first mutated SQL statement including only predicates from the extracted join predicates for querying the data clone,
   generating results by the first mutated SQL statement, the results being tables generated according to the extracted join predicates, the tables including simulated data simulating the confidential data of the original database;
   responsive to the first mutated SQL statement generating results, recursively rebuilding pattern table expressions and subqueries of the original database sub-system;
   validating the first mutated SQL statement;
   executing a query on the tables including simulated data; and
   receiving a results set of the query, the results set excluding the confidential data.

7. The computer program product of claim 6, the method further comprising:
   extracting the first original SQL statement from the original database sub-system including the confidential data.

8. The computer program product of claim 6, wherein the pattern indicative of an SQL type is one of the following patterns:
   a) a simple pattern without host variable,
   b) a simple pattern with host variable,
   c) a nested subquery,
   d) a having clause, and
   e) a table expression.

9. The computer program product of claim 6, the method further comprising:
   determining foreign key constraints associated with the confidential dataset;
   identifying index groups of the foreign key constraints; and
   establishing relationship groups based on the table constraints to set up the data clone.

10. The computer program product of claim 6, the method further comprising:
   identifying column segments in tables generated by the original SQL statements based on relationships between objects, definitions, and predicates; and
   determining weights for the identified column segments according to overlap in columns of the confidential data;
   wherein:
   generating the tables is further based on the determined weights.

11. A computer system comprising:
   a processor set; and
   a computer readable storage medium;
   wherein:
   the processor set is structured, located, connected, and/or programmed to run program instructions stored on the computer readable storage medium; and
   the program instructions which, when executed by the processor set, cause the processor set to perform a method comprising:
      identifying an original database sub-system in an originating computing environment including distribution statistics, structured query language (SQL) statements, and an original database including confidential data;
      capturing original SQL statements from the originating computing environment;
      setting up a data clone of the originating computing environment using table constraints, the distribution statistics, and the SQL statements;
      determining a pattern indicative of a first SQL type of a first original SQL statement;
      reconstructing the first original SQL statement according to a predetermined process for the first SQL type to create a first mutated SQL statement by extracting join predicates in the first original SQL statement;
      creating, from the reconstructed SQL statement, the first mutated SQL statement including only predicates from the extracted join predicates for querying the data clone,
      generating results by the first mutated SQL statement, the results being tables generated according to the extracted join predicates, the tables including simulated data simulating the confidential data of the original database;
      responsive to the first mutated SQL statement generating results, recursively rebuilding pattern table expressions and subqueries of the original database sub-system;
      validating the first mutated SQL statement;
      executing a query on the tables including simulated data; and
      receiving a results set of the query, the results set excluding the confidential data.

12. The computer system of claim 11, the method further comprising:
   extracting the first original SQL statement from the original database sub-system including the confidential data.

13. The computer system of claim 11, wherein the pattern indicative of an SQL type is one of the following patterns:
   a) a simple pattern without host variable,
   b) a simple pattern with host variable,
   c) a nested subquery,
   d) a having clause, and
   e) a table expression.

14. The computer system of claim 11, the method further comprising:
   determining foreign key constraints associated with the confidential dataset;
   identifying index groups of the foreign key constraints; and
   establishing relationship groups based on the table constraints to set up the data clone.

15. The computer system of claim 11, the method further comprising:
   identifying column segments in tables generated by the original SQL statements based on relationships between objects, definitions, and predicates; and
   determining weights for the identified column segments according to overlap in columns of the confidential data;
   wherein:
   generating the tables is further based on the determined weights.

* * * * *